United States Patent [19]
Allport et al.

[11] 3,883,571
[45] May 13, 1975

[54] LIQUID DIPHENYLMETHANE DIISOCYANATE COMPOSITIONS

[75] Inventors: Dennis Charlton Allport; Graham Briggs, both of Manchester, England

[73] Assignee: Imperial Chemical Industries Limited, London, England

[22] Filed: Sept. 10, 1973

[21] Appl. No.: 395,599

[30] Foreign Application Priority Data
Sept. 26, 1972  United Kingdom............... 44404/72

[52] U.S Cl.................. 260/453 AM; 260/2.5 AT; 260/77.5 AT; 260/453 SP
[51] Int. Cl............................................ C07c 119/04
[58] Field of Search................ 260/453 SP, 453 AM

[56] References Cited
UNITED STATES PATENTS
3,394,164  7/1968  McClellan et al. ................. 260/453
3,644,457  2/1972  König et al. ........................ 260/453

*Primary Examiner*—Lewis Gotts
*Assistant Examiner*—Dolph H. Torrence
*Attorney, Agent, or Firm*—Cushman, Darby & Cushman

[57] ABSTRACT

A diphenylmethane diisocyanate composition which comprises diphenylmethane diisocyanate in which from 10 to 35 percent of the isocyanate groups have been reacted with a mixture of alkylene glycols containing at least three carbon atoms. The composition is made by heating together the reactants.

3 Claims, No Drawings

3,883,571

LIQUID DIPHENYLMETHANE DIISOCYANATE COMPOSITIONS

This invention relates to the manufacture of liquid isocyanate compositions based on diphenylmethane diisocyanate.

Diphenylmethane diisocyanate is a solid isocyanate available on the commercial scale and as available, normally consists largely of the 4,4'-isomer with a small content of the 2,4'-isomer. The two isomers are both solids at room temperature having melting points of 42° and 36°C respectively, commercial mixtures of the two isomers optionally containing other isomers such as the 2,2'-isomer in small quantities are also solid at room temperature.

One of the end-uses for diphenylmethane diisocyanate is in the manufacture of micro-cellular plastics for example for use in shoe soles. The micro-cellular plastics may be made by reacting the diisocyanate with a polyester or polyether and a cross-linking agent or chain extender under such conditions that a small amount of gas is generated to form a micro-cellular product. In order that it may be incorporated at room temperature into the polyester or polyether it is preferred that the diisocyanate to be used be in the liquid state at room temperature.

Liquid diphenylmethane diisocyanate compositions are also useful for other end-uses where it is desirable that the diisocyanate be in the liquid form.

We have found that liquid diphenylmethane diisocyanate compositions suitable for use in the above processes may be made by partially reacting the solid diisocyanate with a mixture of alkylene glycols containing at least three constituent glycols. We use the term liquid herein to indicate that compositions remain liquid at room temperature for long periods of time, sufficient in fact for all practical purposes. We do not however claim that the compositions would remain liquid if stored at room temperature for several years as we believe the effect of introducing the alkylene glycol mixture into the molecule is one of retarding the rate of crystallisation rather than one of lowering the melting point to below room temperature. Nevertheless for all practical purposes the compositions may be considered as liquids.

Thus according to the present invention there is provided a diphenylmethane diisocyanate composition which comprises diphenylmethane diisocyanate in which from 10 to 35 percent of the isocyanate groups have been reacted with a mixture of alkylene glycols containing at least three constituent glycols each having at least three carbon atoms.

Any solid diphenylmethane diisocyanate may be used in making the compositions of the present invention including for example diphenylmethane-4,4'-diisocyanate, diphenylmethane-2,4'-diisocyanate and mixtures of these, optionally containing small amounts of other isomers. We prefer to use diphenylmethane-4,4'-diisocyanate containing not more than 10 percent of isomers thereof.

Examples of alkylene glycols which may be used as constituents of the alkylene glycol mixture include diethylene glycol, triethylene glycol, tetraethylene glycol, 1,2- and 1,3-propylene glycols, neopentyl glycol, 1,3-butane diol and 1,2-butane diol.

The proportions of the three or more glycols contained in the mixture may vary widely, and in part the proportions will be dependent on the particular glycols used. Although proportions outside this range may be used we have found that convenient mixtures of glycols are those wherein the molar percentage of any one of the glycols is not more than 70 and not less than 15 percent of total glycols used. We prefer compositions wherein the molar percentage of any one of the glycols is not more than 50 and not less than 25 percent of the total glycols used.

An example of a specific mixture of alkylene glycols which may be used is a mixture of diethylene glycol, triethylene glycol and propylene glycol.

In order to obtain compositions in which from 10 to 35 percent of the isocyanate groups have been reacted with the alkylene glycol mixture, 1 molar proportion of the diphenylmethane diisocyanate is reacted with from 0.1 to 0.35 molar proportions of the alkylene glycol mixture. We prefer to use from 0.15 to 0.30 molar proportions of the alkylene glycol mixture, which results in reaction of 15 to 30 percent of the isocyanate groups. The molar proportions of alkylene glycol mixture referred to above is the sum total of the molar proportions of the alkylene glycol constituents of the mixture.

The compositions of the invention are made by mixing together the diphenylmethane diisocyanate and the mixed alkylene glycols and reacting. The reaction is conveniently carried out at a temperature of 40° to 120°C preferably 60° to 100°C although temperatures outside the wider range may be used. A convenient method of performing the mixing and reaction is to melt the diisocyanate, to add the mixed alkylene glycols dropwise thereto and then heat until reaction is complete.

The final product may then be cooled to room temperature and remains liquid at that temperature on storage.

Optionally stabilisers for example, benzoyl chloride, adipic acid, phosphoric acid or antioxidant may be added before, during or after the reaction.

The product is useful as a liquid isocyanate for the manufacture of polyurethanes and is particularly useful for the manufacture of microcellular polyurethane.

The invention is illustrated by the following example in which all parts are by weight except where otherwise stated.

EXAMPLE 1

4,4'-diphenylmethane diisocyanate (500 parts) is melted and heated at 80°C. A mixture of the following alkylene glycols is then added dropwise at this temperature.

| | |
|---|---|
| Diethylene glycol | 18.9 parts |
| Triethylene glycol | 26.7 parts |
| Propylene glycol | 13.5 parts |

The mixture is then stirred for a further 2 hours at 80°C to complete reaction.

The product on cooling is a clear viscous liquid having an isocyanate content of 22 percent. It remained without any sign of crystallisation or solidification for several weeks.

In the above example, 2 molar proportions of the diisocyanate are reacted with 0.534 molar proportions of the mixed glycols made up of 0.178 molar proportions of each individual glycol. 26.7 percent of the isocya-

EXAMPLE 2

4,4'-diphenylmethane diisocyanate (500 parts) is melted and heated at 80°C. A mixture of the following alkylene glycols is then added dropwise at this temperature.

| | |
|---|---|
| Diethylene glycol | 17.9 parts |
| Propylene glycol | 12.8 parts |
| 1,3-butane diol | 15.1 parts |

The mixture is then stirred for a further 2 hours at 80°C to complete reaction.

The product on cooling is a clear viscous liquid having an isocyanate content of 23 percent. It remained without any sign of crystallisation or solidification for several weeks.

In the above example. 2 molar porportions of the diisocyanate are reacted with 0.505 molar proportions of the mixed glycols made up of 0.168 molar proportions of each individual glycol. 25.25 percent of the isocyanate groups in the diisocyanate are therefore reacted.

EXAMPLES 3, 4 AND 5

The invention is further illustrated by the compositions tabulated below. All the materials were prepared by the method described in Example 1.

| Example | Alkylene glycol mixture and molar proportion used | moles MDI used | NCO value % | Viscosity at 25°C (poise) | Appearance and Storage Stability (at approx. 20°C) |
|---|---|---|---|---|---|
| 3 | diethylene glycol (0.1050) triethylene glycol (0.1050) 1,3-butylene glycol (0.0525) | 1.0 | 22.0 | 16.1 | Clear liquid which remained fluid for several weeks |
| 4 | diethylene glycol (0.0890) triethylene glycol (0.0890) 1,2-propylene glycol (0.0890) | 1.0 | 22.0 | 23.4 | do. |
| 5 | diethylene glycol (0.0878) triethylene glycol (0.0620) 1,2-propylene glycol (0.1224) | 1.0 | 22.4 | 26.7 | do. |

We claim:

1. A diphenylmethane diisocyanate composition which consists essentially of a 4,4'-diphenylmethane diisocyanate containing not more than 10 percent of isomers thereof, and in which from 15 to 30 percent of the isocyanate groups have been reacted at a temperature of 40° to 120°C with a mixture of three alkylene glycols, said alkylene glycols being selected from the group consisting of diethylene glycol, triethylene glycol, tetraethylene glycol, 1,2-propylene glycol, 1,3-propylene glycol, neopentyl glycol, 1,3-butane diol and 1,2-butane diol each of said glycols being present in said mixture in such proportions that no one glycol constitutes more than 50 or less than 25 molar per cent of said total glycols.

2. Composition as claimed in claim 1 wherein the heating is carried out at a temperature of from 60° – 100°C.

3. Process for the manufacture of a diphenylmethane diisocyanate composition which is liquid at room temperature, which comprises reacting together diphenylmethane-4,4'-diisocyanate containing not more than 10 percent of isomers thereof with from 0.10 to 0.35 molar proportions of a mixture of alkylene glycols, said mixture containing at least three constituent glycols each containing at least three carbon atoms, each of said glycols being present in such proportion that no one glycol constitutes more than 50 or less than 25 molar per cent of the total glycols, at a temperature of from 40° – 120°C, said glycols being selected from the group consisting of diethylene glycol, triethylene glycol, tetraethylene glycol, 1,2-propylene glycol, 1,3-propylene glycol, neopentyl glycol, 1,3-butane diol and 1,2-butane diol.

* * * * *